United States Patent
Didier et al.

(10) Patent No.: US 7,724,924 B2
(45) Date of Patent: May 25, 2010

(54) PERSON IDENTIFICATION CONTROL METHOD AND SYSTEM FOR IMPLEMENTING SAME

(75) Inventors: Bernard Didier, Vulaines sur Seine (FR); François Rieul, Saint Germain En Laye (FR)

(73) Assignee: Sagem Securite, Paris (FR)

( * ) Notice: Subject to any disclaimer, the term of this patent is extended or adjusted under 35 U.S.C. 154(b) by 920 days.

(21) Appl. No.: 10/598,819

(22) PCT Filed: Mar. 7, 2005

(86) PCT No.: PCT/FR2005/000544

§ 371 (c)(1),
(2), (4) Date: Sep. 12, 2006

(87) PCT Pub. No.: WO2005/101329

PCT Pub. Date: Oct. 27, 2005

(65) Prior Publication Data

US 2007/0194884 A1 Aug. 23, 2007

(30) Foreign Application Priority Data

Mar. 17, 2004 (FR) .................................. 04 02769

(51) Int. Cl.
*G06K 9/00* (2006.01)
*G06F 7/04* (2006.01)
(52) U.S. Cl. ..................... 382/115; 340/5.82
(58) Field of Classification Search ......... 382/115–124, 382/209, 218, 305; 340/5.82, 5.83; 713/186; 902/3
See application file for complete search history.

(56) References Cited

U.S. PATENT DOCUMENTS

| 5,790,668 | A | 8/1998 | Tomko |
| 6,230,148 | B1 * | 5/2001 | Pare et al. ..................... 705/40 |
| 6,317,834 | B1 * | 11/2001 | Gennaro et al. ............. 713/186 |
| 6,505,193 | B1 * | 1/2003 | Musgrave et al. .............. 707/3 |
| 2003/0061172 | A1 | 3/2003 | Robinson |

FOREIGN PATENT DOCUMENTS

| DE | 199 61 403 A1 | 12/1999 |
| EP | 1 102 216 B1 | 12/1999 |

OTHER PUBLICATIONS

International Search Report for International Application No. PCT/FR2005/000544, dated Jul. 27, 2005, 4 pages.

* cited by examiner

*Primary Examiner*—Daniel G Mariam
(74) *Attorney, Agent, or Firm*—Miller, Matthias & Hull

(57) ABSTRACT

The invention relates to a person identification control method and to a system for implementing same. The inventive method comprises the following steps consisting in: detecting biometric data (23, 48, 79, 94, 108) relating to at least one person; seeking a concordance between the biometric data relating to the person and biometric data that have been pre-stored in a biometric database (26, 51, 83, 97, 110), said pre-stored biometric data relating to persons for whom identification means have already been generated; and, when no concordance is found, generating an identification means (29, 56, 84, 98, 103, 111) that is associated with the person from the biometric data relating to the person and at least one identity (24, 49, 80, 95, 117) for said person.

44 Claims, 11 Drawing Sheets

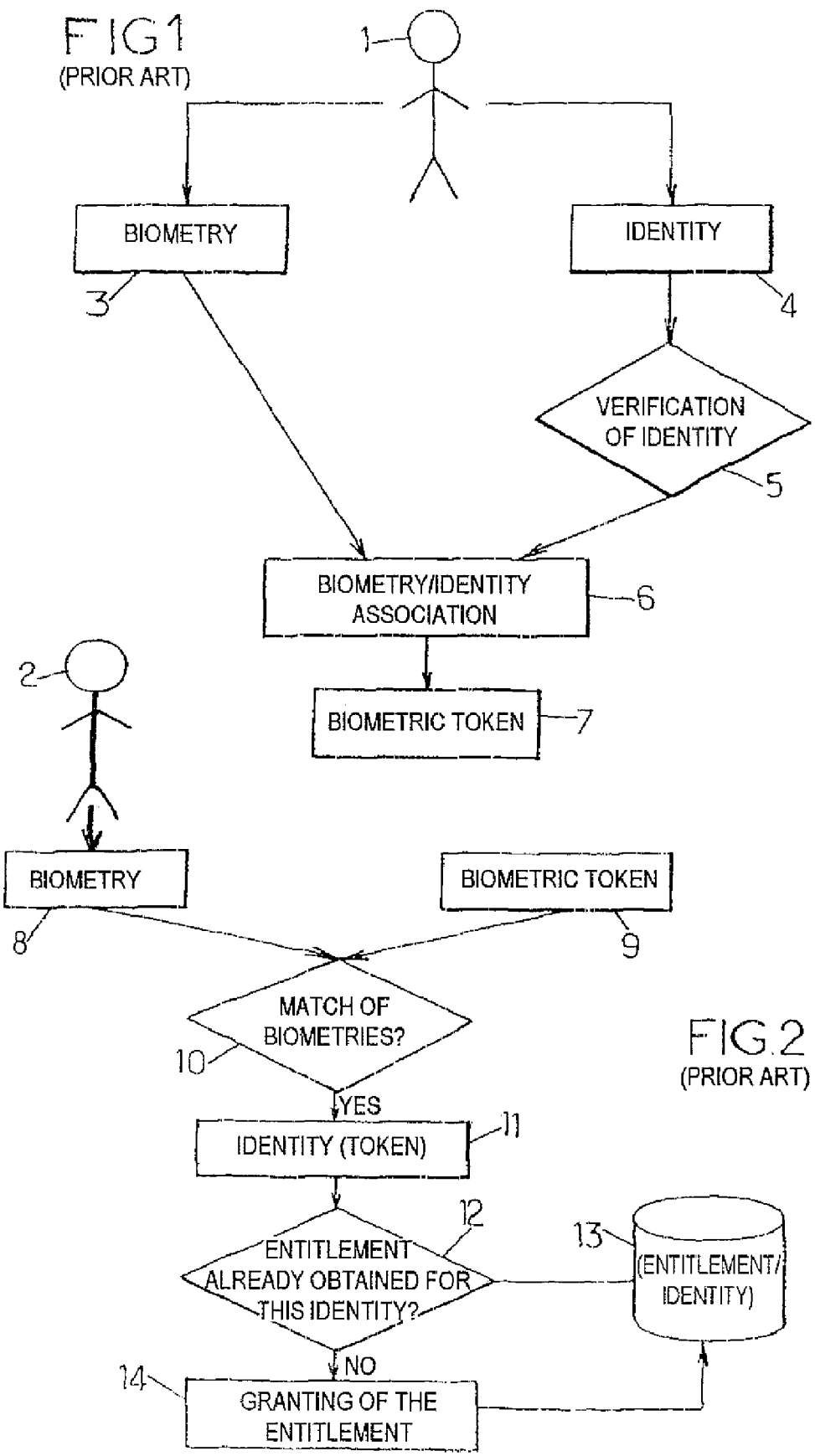

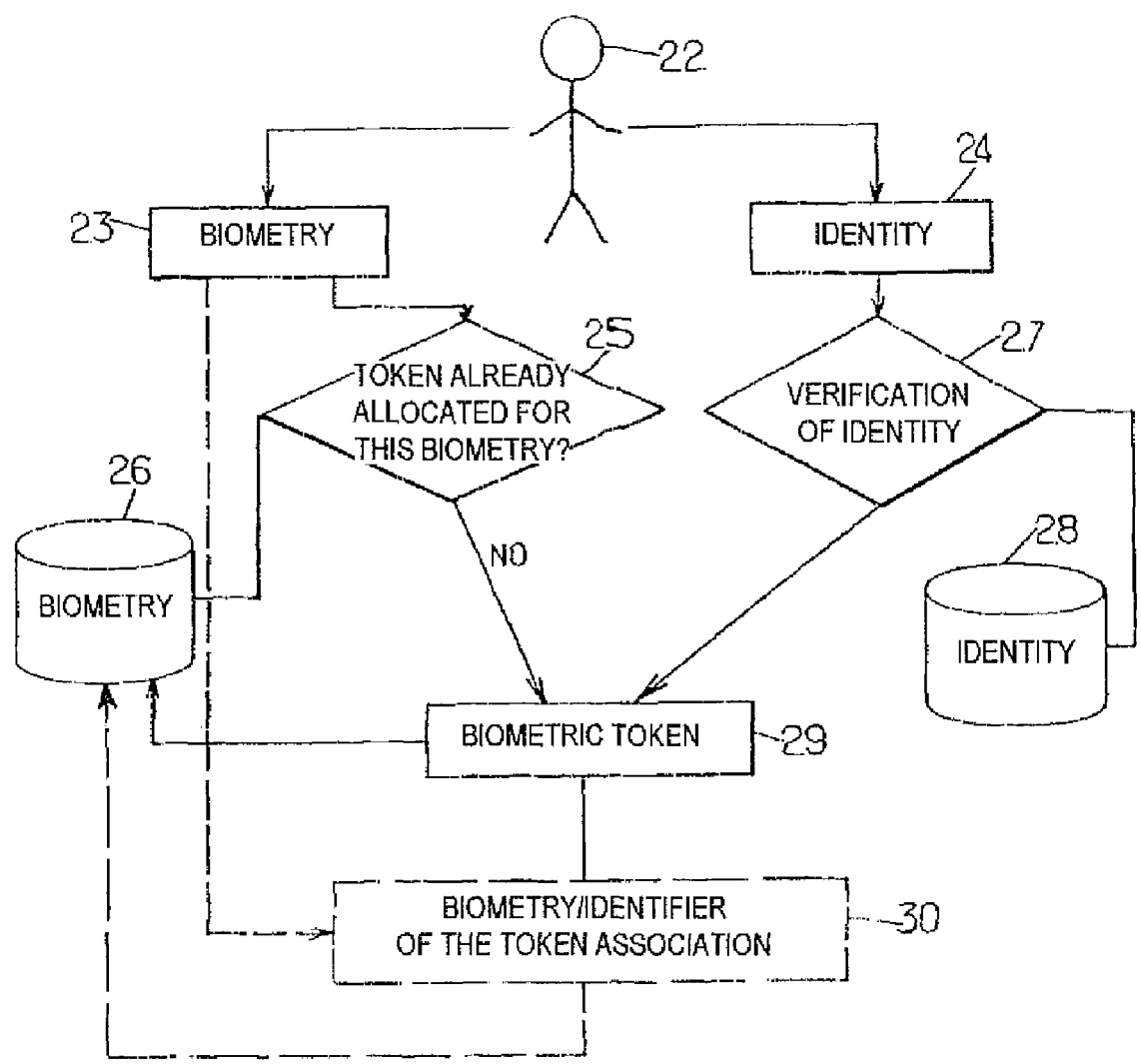

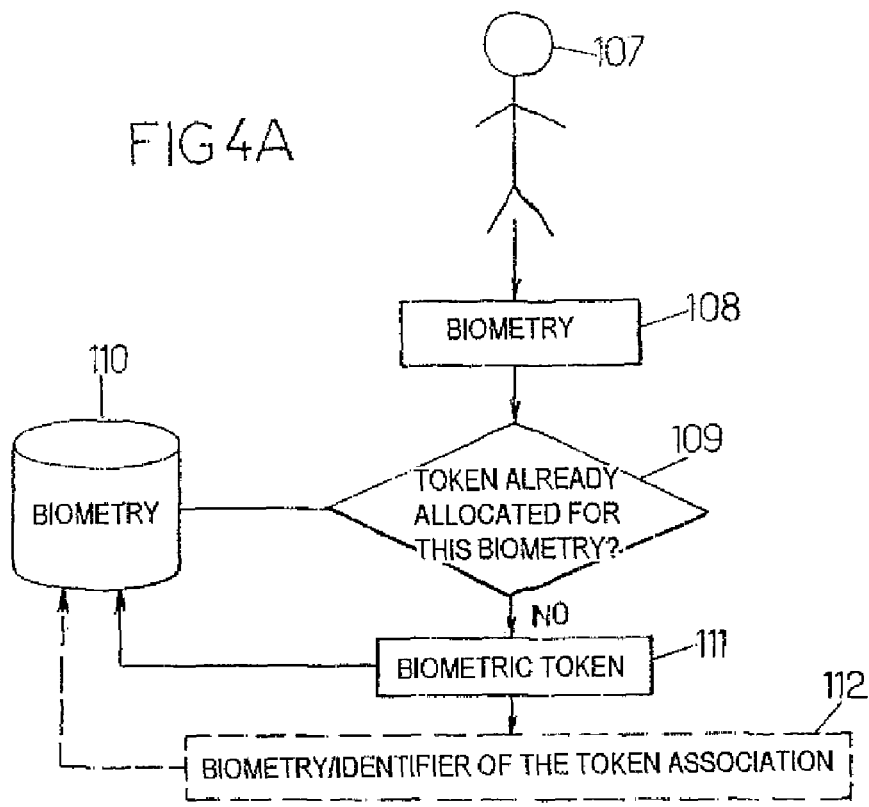
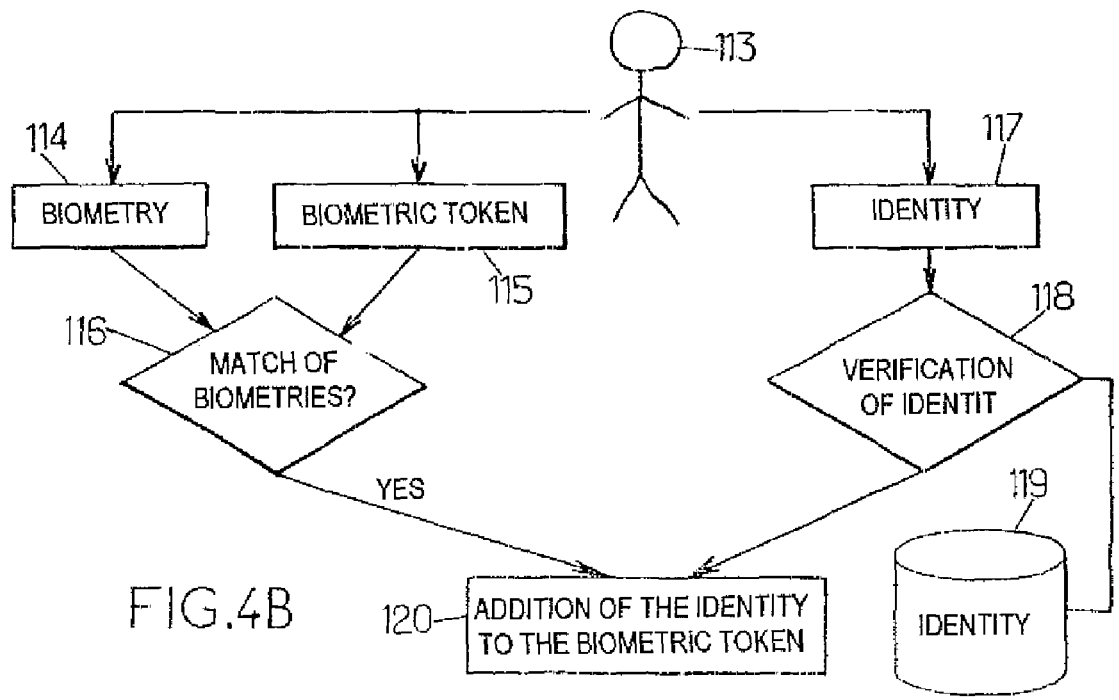

PERSON IDENTIFICATION CONTROL METHOD AND SYSTEM FOR IMPLEMENTING SAME

CROSS REFERENCE TO RELATED APPLICATION

This is the U.S. National Phase of International Application No. PCT/FR2005/00544, filed Mar. 7, 2005, the entire disclosure of which is incorporated by reference.

FIELD OF THE DISCLOSURE

The present invention relates to the identification control of persons. It relates more especially to the generation of a unique means of identification of persons.

BACKGROUND OF THE DISCLOSURE

An especially beneficial application of the invention, although not exclusive, consists in controlling the granting of entitlements to persons having obtained a unique means of identification.

The term "entitlement" is to be understood in its widest acceptance, the granting of an entitlement to a person being understood as the concrete realization of a possibility offered to this person. By way of example, a person may have a driving license, a building access badge, a transport pass be granted to them, or else be allocated a retirement fund, compensation or else a refund within the context of a social security system for example, etc.

The granting of such entitlements is confronted with a problem of uniqueness, in so far as one generally does not wish to grant the same entitlement to the same person several times.

Thus, certain current systems operate according to the following principle: a person wishing to have an entitlement granted to them firstly states their identity (for example their surname and forenames), then a check of this identity is performed with means that are generally limited and rather unreliable. Next, a check is made to verify whether the person bearing this identity has not already received the entitlement claimed, for example by consulting a database wherein are stored the identities of all the persons having already acquired the relevant entitlement. If the check shows that the person has not already acquired this entitlement, the latter is then granted to them and this information is taken into account in the database.

However, if the relevant person has usurped one or more identities, they can obtain the entitlement a number of times equal to the number of identities that they present to the system. The uniqueness of granting entitlements is not therefore ensured in such systems.

Furthermore, such systems grant entitlements in conjunction with the identity of the persons, so that they do not make it possible to grant entitlements to persons by virtue of their capacity, for example their membership of an association of anonymous individuals.

To limit these drawbacks and in particular to make the identification of persons more reliable, it is known to use biometric data associated with persons. The resulting principle is illustrated in FIGS. 1 and 2.

FIG. 1 shows a prior phase of so-called enrollment, in the course of which a means of identification of a person is generated, this means of identification creating a tie between the biometric data of the person and their identity. Thus, the person 1 possesses a biometry 3, that is to say biometric data characterizing them, such as fingerprints, characteristics of the iris of their eyes, etc. The person 1 states their identity 4, which is then verified (step 5). Next, an association is made between the biometry 3 and the identity 4 of the person 1 (step 6). This association is finally stored on a means of identification associated with the person 1. The means of identification is typically held by the person themselves, so that they alone possess a trace of the association between their biometry 3 and their identity 4. Such a means of identification associated with a person is commonly called a biometric token. It may for example take the form of an identity card on which the fingerprints of the person have been affixed.

FIG. 2 shows a subsequent phase of granting an entitlement. A person 2 claiming the granting of an entitlement must have been the subject of a prior enrollment according to the principles illustrated in FIG. 1. The biometry 8 of this person is then compared with that which was kept on the biometric token 9 associated with this person during their enrollment. If the biometries match (step 10), it is then possible to retrieve the identity of the person 2 in a relatively reliable manner (step 11) on the basis of the identity that they stated, for verification, during their enrollment, and which was stored on the biometric token 9 in association with the biometry 8 of this person. Thereafter, in step 12, a check is made to verify whether the entitlement in question has already been obtained in relation to the identity retrieved. To do this, a search is performed for the presence of said identity in a database 13 storing the identities of the persons having acquired the entitlement in question. If the person 2 had not yet acquired the entitlement, the latter is finally granted to them in step 14 and this information is taken into account in the database 13.

This mode of operation therefore improves the reliability of the identification of a person, since the identity stated by each person and verified during their enrollment is retrieved on the basis of this person's own biometric data and of the biometric token previously issued to this person.

However, it does not guarantee the uniqueness of the granting of entitlements. Specifically, a person possessing several biometric tokens, obtained during successive enrollments, may get an entitlement granted several times, with a different biometric token each time. This is especially true when the person obtains several biometric tokens with different identities for each token, this possibly occurring in particular when step 5 of verification of the identity is of low reliability.

A known and effective way of remedying this problem consists in storing, in a centralized database, an association between the biometry and the identity of each person. FIG. 3 illustrates a phase of enrollment in accordance with this mode of operation. The person 15 possesses a biometry 16 and states an identity 17 which is verified by a check in step 18. In step 19 a check is made to verify whether a biometric token has already been allocated to the person 15 by searching for the presence of the stated identity 17 in the database 20 of the identities storing the biometry/identity pairs of the persons for which a biometric token has already been generated. If the person 15 did not yet have a biometric token, one is then generated for them in step 21, thereby guaranteeing that a single biometric token is generated for each person. The database 20 is finally updated to take account of the generation of the new token.

Subsequently, an entitlement can be granted as in the case illustrated in FIG. 2, if need be.

However, the mode of operation illustrated in FIG. 3 requires that biometric data and identities of persons be placed in correspondence in a database 20. Such a correspondence is rather undesirable since it could be used for purposes other than the simple granting of entitlements and thus run counter to individual freedom. It would even be contrary to legal provisions in respect of the protection of individual freedom in certain countries.

An object of the present invention is to limit the abovementioned drawbacks, by permitting an identification of persons which does not impede individual freedom.

Another object of the invention is to improve the reliability of the uniqueness of the means of identification associated with persons, with a view for example to affording control of the granting of entitlements to these persons, without thereby creating a database linking for each person, their biometry and their identity.

Another object of the invention is to limit the possibilities of fraud during the granting of entitlements.

Yet another object of the invention is to allow control of the granting of entitlements to persons without consideration of their identity.

SUMMARY OF THE DISCLOSURE

The invention thus proposes a method of identification control of persons, comprising a phase of generating a unique means of identification associated with at least one person comprising the following steps:

/a/ detecting biometric data relating to said person;

/b/ searching for a match between the biometric data relating to said person and biometric data previously stored in a biometric database, said previously stored biometric data relating to persons for which means of identification have been previously generated; and, when no match has been found:

/c/ generating a means of identification associated with said person from biometric data relating to said person and at least one identity of said person.

Step /b/ of the method thus makes it possible to ensure that a means of identification, for example a biometric token, has not already been associated with the relevant person in the past. One thus limits the possibilities of the same person obtaining several means of identification.

According to an advantageous embodiment of the invention, the method furthermore comprises a second phase of granting at least one entitlement to said person, in which:

/e/ said person identifies themselves with the aid of the means of identification which has been previously associated therewith; and /f/ said entitlement is granted to said person when said entitlement has not already been granted to said person a number of times equal to a predetermined number.

The granting of entitlements being subject to identification of the person on the basis of the unique means of identification previously generated for said person, the person is thus prevented from being able to have entitlements granted several times by identifying themselves on the basis of distinct means of identification.

The phases of the method are applied to at least one person, that is to say a biometric token is associated with a given person or with a group of given persons. Likewise, the entitlement or entitlements are granted to a given person or to a group of given persons.

In a particular embodiment of the invention, a check of the identity of the person is performed before step /b/.

The granting of the entitlement is performed on the basis of an identifier, which may be the identity of said person or else an identifier of the biometric token which has been associated therewith (anonymous mode).

In a particular embodiment of the invention, the identifier of a biometric token is revoked before generating another one for the same person or the same group of persons. This may for example occur when the person claims to have lost his first biometric token. One thus advantageously prevents the multiple generations of tokens for one and the same person or one and the same group of persons, possibly giving rise to multiple grantings of entitlements fox these persons.

In particular embodiments of the invention, a key is calculated for each person, then associated with the identity thereof. It may for example be a biometric key which is calculated on the basis of biometric elements of the person, but is weakly discriminating so that the person cannot easily be retrieved on the basis of their key. This key may also be generated randomly, in which case it is moreover associated with the biometry of the relevant person.

The invention furthermore proposes a system, comprising means for implementing the abovementioned method.

When only the first phase of the method is implemented, the system may then be likened to a device.

When, on the other hand, the method comprises the first phase of generating a unique means of identification associated with at least one person, as well as a second phase of granting at least one entitlement to this person, the system may then comprise functional means able to implement each of the two phases of the method within one and the same piece of equipment, or else distinct physical entities each ensuring the implementation of one of the two main phases of the method.

BRIEF DESCRIPTION OF THE DRAWINGS

FIG. 1 is a diagram, already commented on, showing a known mode of enrolling a person;

FIG. 2 is a diagram, already commented on, showing a known mode of granting entitlements to a person;

FIG. 4 is a diagram showing a mode of enrolling a person according to the invention;

FIG. 4A is a diagram showing a first phase of a mode of enrolling a person according to the invention;

FIG. 4B is a diagram showing a second phase of a mode of enrolling a person according to the invention;

DETAILED DESCRIPTION OF THE DISCLOSURE

Figure 3:
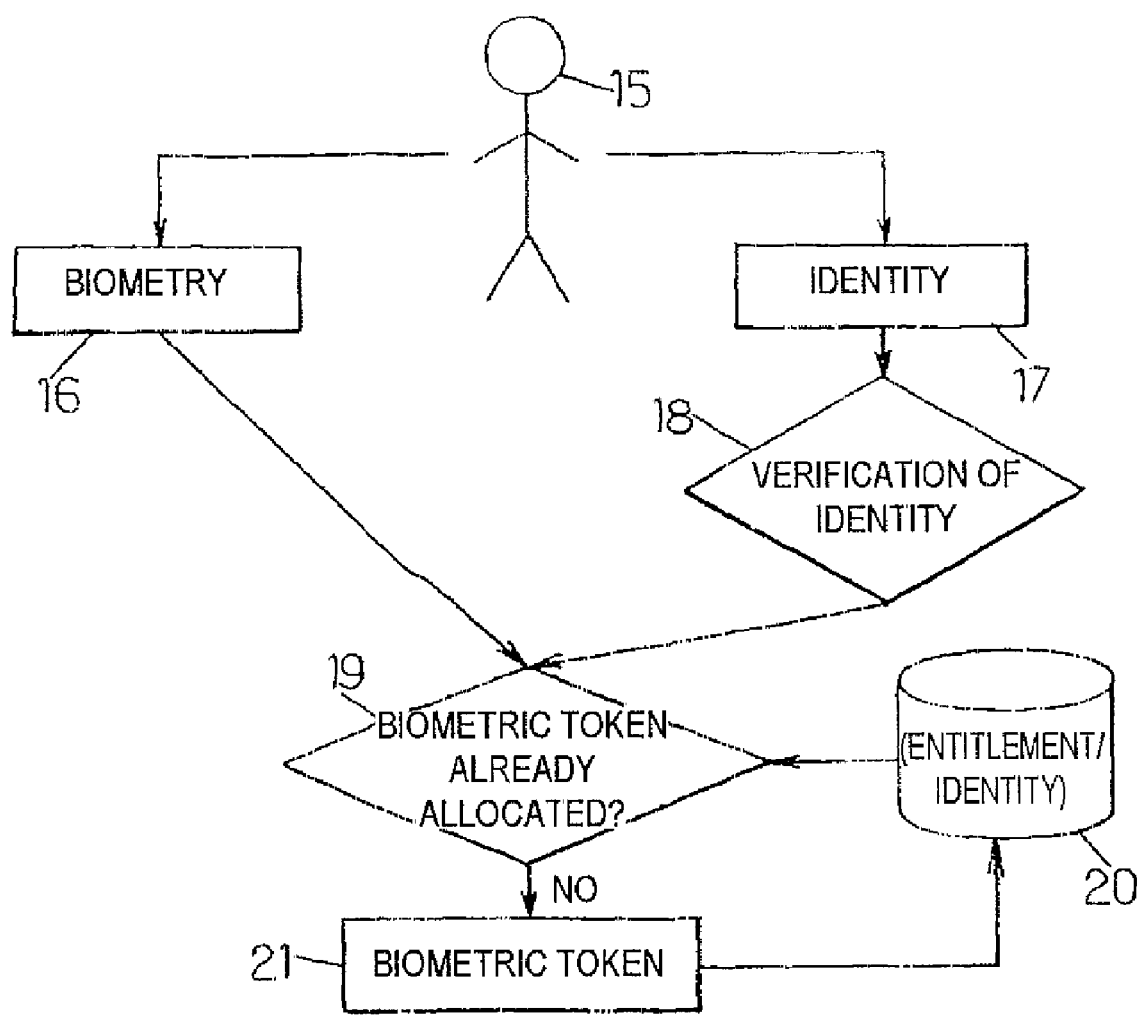
FIG. 3 is a diagram, already commented on, showing another known mode of enrolling a person.

FIG. 4 is a basic diagram illustrating a phase of enrollment according to the invention, that may possibly precede a granting of entitlements. This phase of enrollment consists in generating a unique means of identification of a person 22, in such a way as to avoid the problems of generating multiple means of identification to one and the same person as was explained in the introduction.

According to this figure, the person 22 has biometric data of their own, this biometry 23 of the person 22 is detected and then compared with a set of biometries stored in a biometric database 26, corresponding to biometric data of persons having already been the subject of an enrollment, that is to say already obtained a means of identification. If the biometry 23 of the person 22 matches one of the biometries stored in the database 26, this implies that the person 22 has already been the subject of an enrollment, and therefore has already received a biometric token. In this case, it is for example possible to decide not to re-generate a biometric token for this person 22, or else to proceed with additional checks. When in step 25, no match has been found between the biometry 23 and the biometries stored in the base 26, this implies that the person 22 has not yet been the subject of an enrollment, and this justifies the generation of a means of identification for this person 22. It will be noted that the verification step 25 is especially reliable since it is based on biometric data which literally characterize the relevant person.

Moreover, the person 22 wishing to follow an enrollment procedure, states their identity 24. This identity is then the subject of a verificatory check in step 27, this check possibly being of various kinds. It is for example possible to verify the presence of the stated identity 24 in a database 28 containing identity information on all the persons apt to come forward for an enrollment.

The biometric token 29 ultimately generated for the person 22 is made up of the biometry 23 and of the identity 24 of this person. For example, this token comprises elements of the biometry 23, elements of the identity 24, as well as a unique identifier of the token. This may for example be an identity card on which fingerprints of the person 22 have been affixed.

Thus, the enrollment illustrated in FIG. 4 makes it possible to generate a means of identification which is unique for a given person, in so far as a check is made in a step 25 to verify whether the relevant person has already obtained a token. One thus prevents the granting of several biometric tokens to one and the same person, thereby limiting the subsequent possibilities of use of these various tokens, for example to obtain the granting of several entitlements on the basis of the various biometric tokens obtained by this person.

After the generation of the biometric token 29 associated with the person 22, the database 26 is advantageously updated to take into account the biometry 23, in such a way that the person 22 can no longer obtain a biometric token during a subsequent new enrollment procedure, once the biometric token 29 has been obtained.

In an advantageous embodiment of the invention, the biometric database 26 stores not only elements of biometry, but also identifiers of tokens. Thus, each biometry stored in the base 26 is associated with a biometric token identifier granted to the person possessing said biometry. A tie between the biometry verified and the token granted is thus retained, although without this tie allowing a direct correspondence between biometry and identity outside of the token. Specifically, the identifier of a biometric token is not kept in the identities verification database, but it is for example incorporated with the biometric token itself.

In this embodiment, it is therefore appropriate, with reference to FIG. 4, once the biometric token 29 has been generated for the person 22, to associate the biometry 23 of the person 22 with an identifier of the biometric token 29 (step 30), and then to store the identifier of the token 29 in association with the biometry 23 in the biometric database 26.

It will be noted, that in the example described with reference to FIG. 4, a biometric token 29 has been generated so as to be associated with a person 22. However, it is also possible to generate a biometric token for a set of persons. For example, a unique token can be generated for a group of persons having a tie between them, such as a family. In this case, the biometric token generated will advantageously bear biometry and identity elements relating to each of the persons of the group.

FIGS. 4A and 4B illustrate a variant embodiment for the enrollment phase, in which the unique means of identification associated with a person or with a given group of persons is generated in two stages.

The person 107 of FIG. 4A possesses a biometry 108. As in the previous case, in a step 109, a search is performed to establish whether a token has already been allocated for this biometry 108, for example by verifying the presence of this biometry in a database of biometries 110. If no token has yet been allocated to the biometry 108, one is generated on the basis of the biometry 108 of the person 107, and the database 110 is advantageously updated. Thus, the biometric token 111 is obtained on the basis of biometric data solely at this juncture. Optionally, the identifier of the token 111 is associated with the biometry 108 (step 110), and this association is advantageously updated in the database 110.

In a second stage, a person 113, who may for example be the same person as the person 107 of FIG. 4A, can have an identity added to the biometric token which was previously associated therewith. Thus, the person 113 of FIG. 4B presents the biometric token 115 which was previously associated with them. A check is done in step 116, to ensure that the biometric token 115 is rightly in the possession of the person 113. For this purpose, the matching of the biometry 114 of the person 113 and the biometry on the basis of which the biometric token 115 was generated is verified, this information advantageously being registered on the token 115. Moreover, the person 113 states their identity 117. The latter is the subject of a verificatory check in step 118, for example by searching for this identity in a database of identities 119. After verificatory checks, the identity 117 is added to the biometric token 115 (step 120).

The enrollment according to this embodiment thus consists of two independent and asynchronous phases. The biometric token associated with a person is ultimately generated on the basis of biometric data and of identity data, but it was possible to disclose and register these data at different moments.

Furthermore, it is possible to implement the second phase of such an enrollment repeatedly (illustrated in FIG. 4B), so as to register several identities of different kind on one and the same biometric token. For example, an identity may pertain to a civil status of the relevant person, while another identity is a professional identity.

A person possessing a biometric token, which was granted to them for example on completion of an enrollment procedure as illustrated in FIG. 4, can then claim the granting of one or more entitlements. This granting may be performed by virtue of the identity of the person who claims an entitlement, or else independently of their identity.

Figure 5:
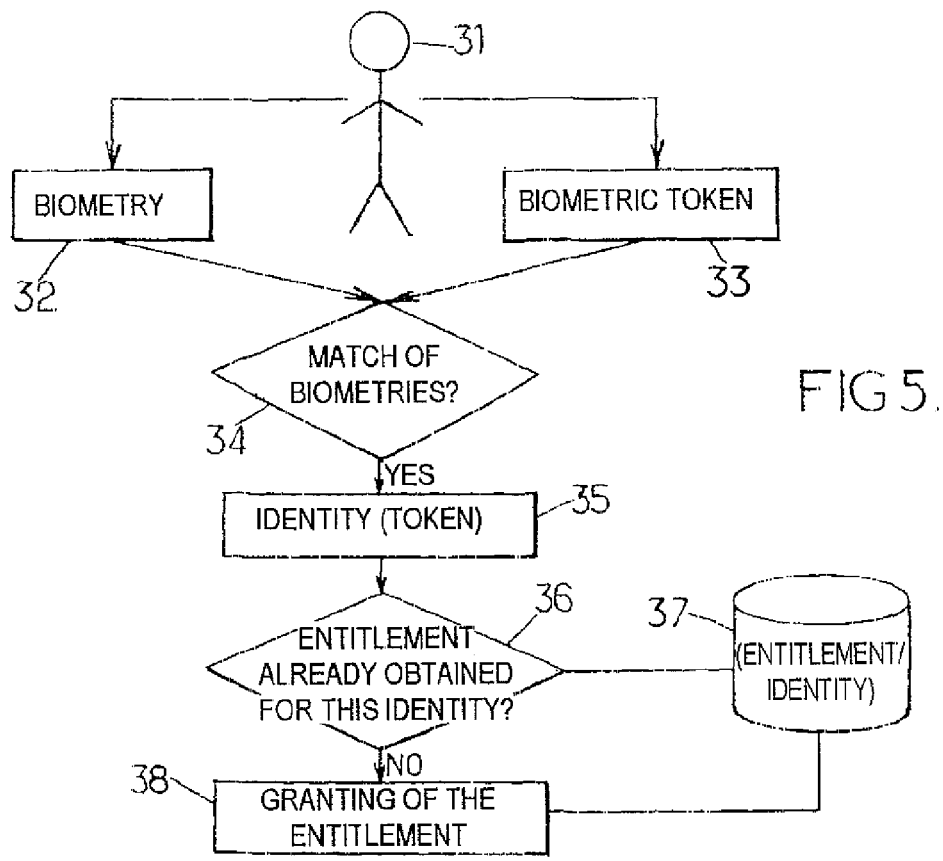
FIG. 5 is a diagram showing a mode of granting any entitlement to a person as a function of their identity, according to the invention.

FIG. 5 illustrates a case of granting an entitlement to a person on the basis of their identity. The person 31 who claims an entitlement may be for example the same person as the person 22 who has previously undergone an enrollment procedure. Said person possesses a biometry 32 as well as a biometric token 33 which was previously associated therewith. A check is then carried out to verify, in a step 34, whether the biometry 32 of the person 31 and the biometry stored on the biometric token 33 presented by the person 31 do indeed match. If such is not the case, this implies that the biometric token 33 presented by the person 31 was not generated for this person and is therefore not associated with them. No entitlement is then granted in a case of this kind.

On the other hand, if the biometry 32 of the person 31 and the biometry on the basis of which the biometric token 33 was generated do match, this implies that the token 33 is rightfully in the possession of the person 31. The identity of the person 31 is retrieved from the biometric token on which it is registered (step 35). A check is then carried out to verify that the entitlement claimed has not already been granted to the person 31 on the basis of their identity (step 36). For this purpose, a check is made to verify the presence, in a database 37 of the identities, storing the identities of all the persons having already obtained the relevant entitlement, of the identity retrieved in step 35. It will be noted that should the granting relate to a set of distinct entitlements, the database 37 of the identities stores the identities of the persons having already obtained the granting of an entitlement from among the set of entitlements, in conjunction with this entitlement, in such a way as not to prevent a person having already obtained an entitlement of said set of entitlements from getting another one granted subsequently.

If the identity retrieved in step 35 does not appear in the base 37, in conjunction with the entitlement claimed by the person 31, this implies that this person has not yet been granted the entitlement that they are claiming. The granting of this entitlement is then carried out in step 38. In the converse case, no entitlement is granted to the person 31, since the latter has already obtained it previously. When the entitlement claimed by the person 31 is granted in step 38, the database 37 is then updated to take account of this information, that is to say that the identity 35 of the person 31 is stored in the database 37 in conjunction with the entitlement granted.

Figure 6:
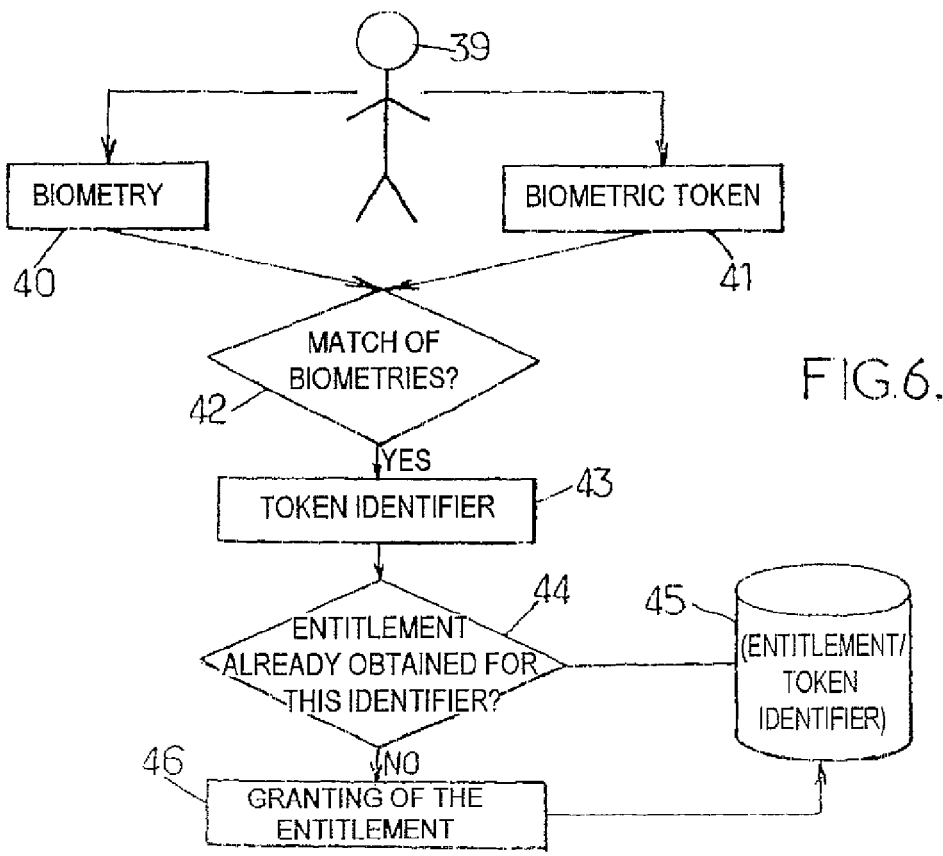
FIG. 6 is a diagram showing a mode of granting an entitlement to a person independently of their identity, according to the invention.

In the example described with reference to FIG. 5, one seeks to grant an entitlement to a given person just once. However, it is also conceivable to grant an entitlement a predetermined number of times for a given person or a group of given persons. In this case, it may be advantageous to store moreover, in the database 37, an indication relating to the number of actual grantings of an entitlement for each identity in conjunction with said entitlement. A check is then made to verify in step 36 whether the entitlement claimed by the person 31 has already been obtained for the identity retrieved in step 35, a number of times equal to the predetermined number. One thus ensures that the entitlement will not be granted to the person 31 a greater number of times than said predetermined number. FIG. 6 illustrates an embodiment of the phase of granting one or more entitlements for one or more persons, in which the granting is performed independently of the identity of the person. A person 39 having a biometry 40 and possessing a biometric token 41, claims an entitlement. As in the previous case, the biometry 40 and that on the basis of which the biometric token 41 was obtained, for example in an enrollment procedure, and which is advantageously stored on the token 41, are compared in step 42. If the biometries match, this implies that the biometric token 41 is rightly associated with the person 39. The identifier of the biometric token 41, which is advantageously registered on the biometric token itself, is then detected in a step 43.

Then in step 44, a check is made to verify whether the entitlement claimed by the person 39 has already been obtained for such a token identifier. For this purpose, a database 45 storing the identifiers of tokens of all the persons having obtained an entitlement is advantageously consulted, the identifier of tokens being stored in conjunction with the entitlement granted for this identifier. When the entitlement has not yet been obtained for such an identifier, the entitlement claimed by the person 39 is then granted thereto during a step 46, then this granting information is taken into account by the addition of the identifier of the token obtained in step 43 to the database 45 in conjunction with the entitlement granted.

Thus, the entitlement claimed by the person 39 has been granted thereto without the identity of this person ever being detected or stored. This embodiment is especially beneficial when the entitlement may be claimed by a set of persons by virtue of their capacity, for example the members of an association of anonymous persons.

As in the case described with reference to FIG. 5, the entitlement granted to the person 39 according to the embodiment of FIG. 6, could be granted a predetermined number of times, rather than in a unique manner. In this case, the number of grantings of an entitlement for one and the same token identifier is advantageously the subject of an additional entry in the database 45.

The granting of an entitlement according to the embodiments illustrated in FIGS. 5 and 6 is therefore controlled, in so far as each person requesting the granting of an entitlement obtains a unique biometric token during a prior phase of enrollment, then the entitlement is granted thereto conditionally by virtue of information available from this biometric token. The chances of granting an entitlement only a predetermined number of times to one and the same person are thus increased.

Furthermore, the mechanism described above allows effective separation of the biometric data on the one hand and of the identity of the persons on the other hand. Specifically, none of the databases used in the enrollment phase, as in the entitlements granting phase, contains both biometry information and information relating to identities of persons. Only the biometric token generated during the enrollment phase in relation to a given person, contains a tie between the biometry and the identity of this person, so that this tie is not generally available other than from said person.

As far as the means for implementing the invention are concerned, a first entity 105 can be charged with the implementation of the enrollment phase. In this case, this entity 105 is then a device which coincides with the overall system 104.

Figure 12:
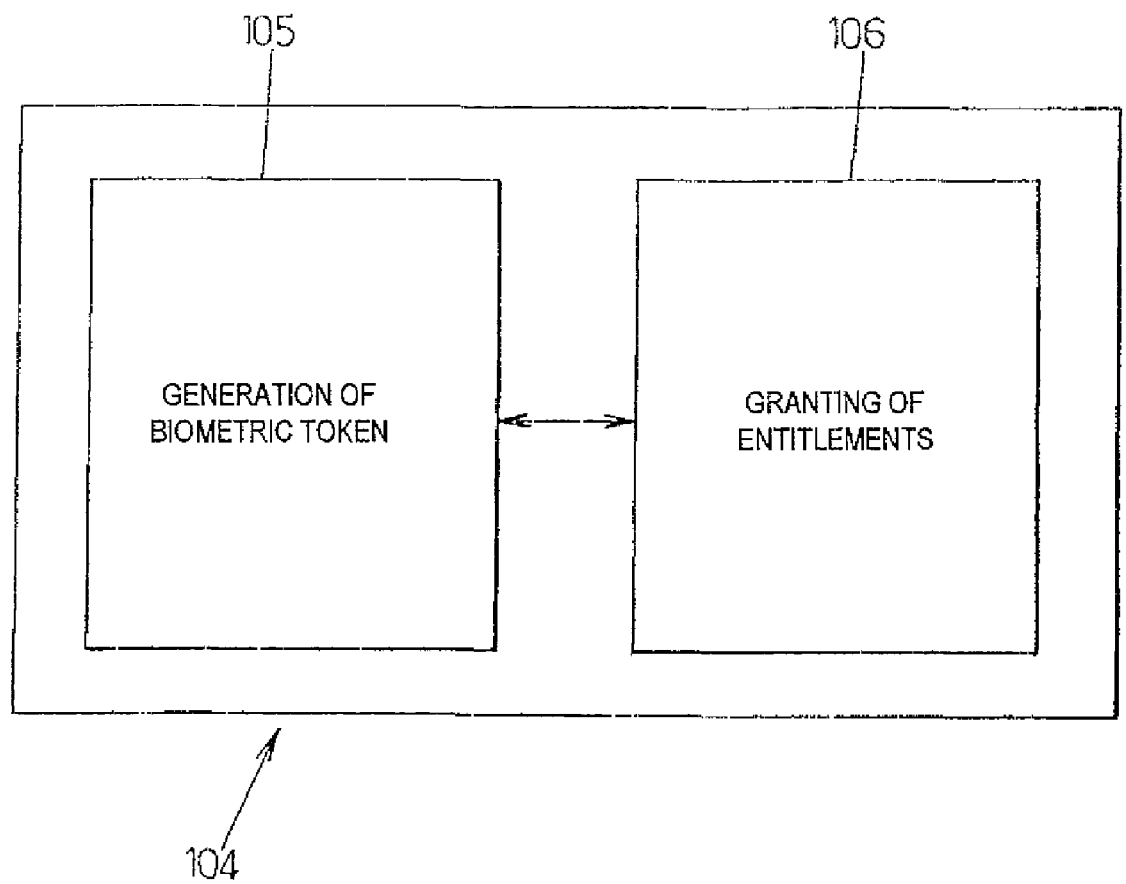
FIG. 12 is a simplified diagram of a system allowing the granting of entitlements according to the invention.

If the second phase of granting entitlements is moreover implemented, a second entity 106 is charged with granting entitlements, as has been represented diagrammatically in FIG. 12. The overall system 104 then consists of two distinct entities 105 and 106 and it allows the granting of entitlements. Each of the entities, within the system 104, can operate independently, that is to say that a person can request in a first stage that they be assigned a biometric token. This operation is then carried out with the aid of the entity 105. Next, said person can request the granting of an entitlement immediately following their enrollment, or, on the contrary, well after their enrollment. The granting of the entitlement is then performed by the entity 106. In other embodiments set forth below, interactions are possible between the two entities 105 and 106.

As a variant, the system 104, allowing the granting of the entitlements, can group together within a single piece of equipment first functional means able to implement the enrollment phase described hereinabove (105 then designates these first functional means), and second functional means able to grant entitlements in accordance with the second phase described hereinabove (106 then designates these second functional means).

The embodiments of the invention that were described above, do not make it possible, however, to totally eradicate the risk of a person possibly getting associated with several biometric tokens, and possibly subsequently having the same entitlement granted several times, doing so by declaring several different identities.

Specifically, if the person 22 of FIG. 4 has obtained a unique biometric token 29 on completion of an enrollment phase, then claims to have lost their token 29, they can undergo a new enrollment phase in the course of which they state a new identity, different from the identity 24 previously declared. If the step of verifying the identity 27 is not sufficiently reliable, as is sometimes the case in reality, it is possible for the person 22 to obtain a new biometric token generated from his biometry 23 and from the new identity that they have declared. This same person can then obtain the granting of an entitlement that they had already obtained, for example according to the principles described with reference to FIG. 5 or to FIG. 6, since no entitlement has yet been granted for the new identity declared by the person 22, nor for the identifier of the token newly obtained by this person.

Figure 7:
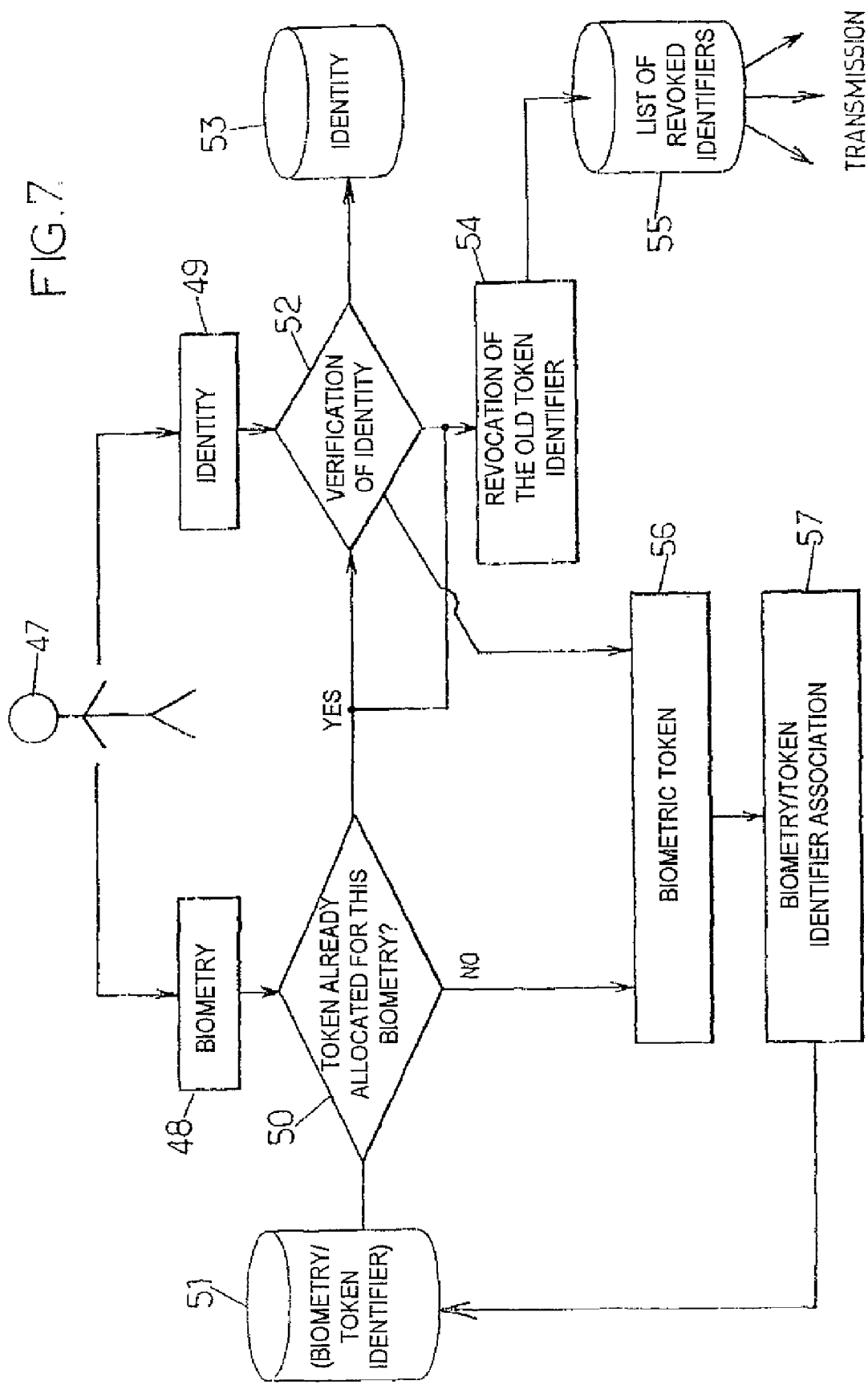
FIG. 7 is a diagram showing a mode of enrolling a person, according to a particular embodiment of the invention.

FIG. 7 shows an embodiment of the enrollment phase aimed at prohibiting the generation of several biometric tokens for one and the same person on the basis of different identities, and hence at reducing the risks of multiple granting of one and the same entitlement to this same person, on the basis of their various identities declared. Thus, according to FIG. 7, the person 47 can obtain a first unique biometric token 56 on the basis of their biometry 48 and of the identity 49 that they state during their first enrollment, in a similar manner to what was described with reference to FIG. 4. It is henceforth considered that this same person 47 attempts to have a new biometric token allocated by stating a new identity 49. In this case, step 50 detects that a biometric token has already been allocated to this person by retrieving the biometry 48 of the person 47 from the database 51 storing the biometries of the persons having already obtained a token, these biometries being associated in the base with an identifier of the respective token.

A check is then made to verify the new identity 49 stated by the person 47 in step 52. Given the existing risks that the person 47 states a different identity 49 from that that they had stated during their first enrollment, the verification of the identity of step 52 is advantageously performed with enhanced reliability in this case, for example by querying a database 53 of the identities containing multiple information on the identity of the persons. If the identity 49 stated by the person 47 is erroneous, it is then possible to choose not to generate a new biometric token for this person.

Furthermore, when step 50 has revealed that a token had already been allocated to the person 47, the identifier of the biometric token which had been previously obtained by this person 47 is revoked (step 54). This revocation may be done by registering the old token identifier associated with the person 47, that is to say the identifier of the biometric token previously obtained by the person 47, in a list of revoked identifiers 55.

This list may be stored in a database. When the system allowing the granting of the entitlements comprises two distinct entities (one for generating the tokens and another for actually granting the entitlements), the database containing the list of revoked identifiers 55 must be consultable by the entity charged with the granting of the entitlements (entity 106 in FIG. 12).

As a variant, the list of revoked identifiers 55 set up by the entity implementing the enrollment phase (entity 105 in FIG. 12) is transmitted to the entity charged with the granting of the entitlements (entity 106 in FIG. 12). This transmission may be done according to diverse modes. For example, it may be done periodically, the complete list of revoked identifiers being transmitted at each period, or else only the revoked identifiers added to the list 55 since the last period are transmitted during a new period. It is again possible to transmit each revoked identifier to the entity charged with the granting of the entitlements as soon as this identifier is added to the list 55, so as to have instantaneous transmission of the revoked identifiers.

The revocation of the identifier of the biometric token previously generated for the person 47 thus makes it possible to prevent the person 47 from being able to have two different biometric tokens in force.

Figure 8:
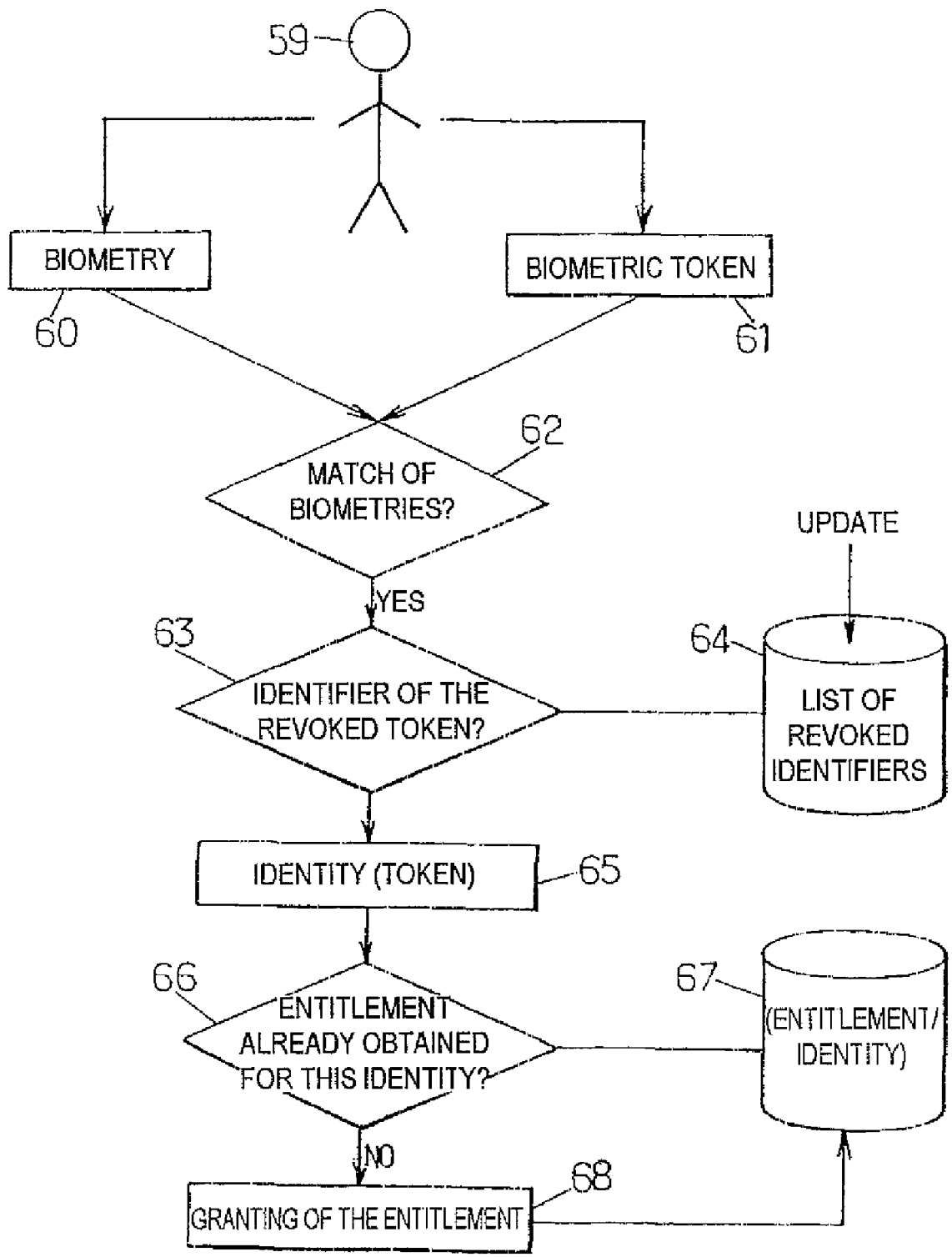
FIG. 8 is a diagram showing a mode of granting an entitlement to a person as a function of their identity, according to a particular mode of the invention.

A subsequent granting of the entitlements is then conditioned by the fact that the biometric token presented by a person is indeed in force. FIG. 8 illustrates such a mode of granting an entitlement. A person 59 having a biometry 60 as well as a biometric token 61 claims the granting of one or more entitlements. As in the above-described cases of granting, a check is made in step 62 to verify a match between the biometry 60 and that stored on the biometric token 61 generated during a prior enrollment phase. When the biometries match, a check is carried out, in a step 63, to verify whether the identifier of the biometric token 61 associated with the person 59 is in force or else if it has been previously revoked. For this purpose, a check is carried out to verify the presence or the absence of the identifier of the biometric token 61 in a list of revoked identifiers 64.

The list of revoked identifiers 64 is obtained on the basis of the list of revoked identifiers 55. For example, when the list of revoked identifiers 55 has been stored in a database accessible from the entity (physical or functional) charged with the granting of the entitlements, the list 64 is then the same as the list 55, and it suffices to consult said database to conclude the revocation or non-revocation of the relevant biometric token. As an alternative, the list 64 is different from the list 55, but it is updated on the basis of the latter during the transmission of revoked identifiers to a memory space of the entity charged with the granting of the entitlements, said transmission possibly being instantaneous or periodic, partial or complete, as indicated hereinabove.

If, in step 63, it is concluded that the identifier of the biometric token 61 used by the person 59 has been revoked, it is then possible to choose not to grant the entitlement claimed to the person 59. On the contrary, if the identifier of the biometric token 61 associated with the person 59 is indeed in force, one then proceeds as in the case described previously with reference to FIG. 5, to grant the entitlement to the person 59 during a step 68, after having verified that the identity 65 of the person 59 registered on the biometric token 61 has not already been the subject of the granting of the same entitlement, once or, more generally, a predetermined number of times.

Figure 9:
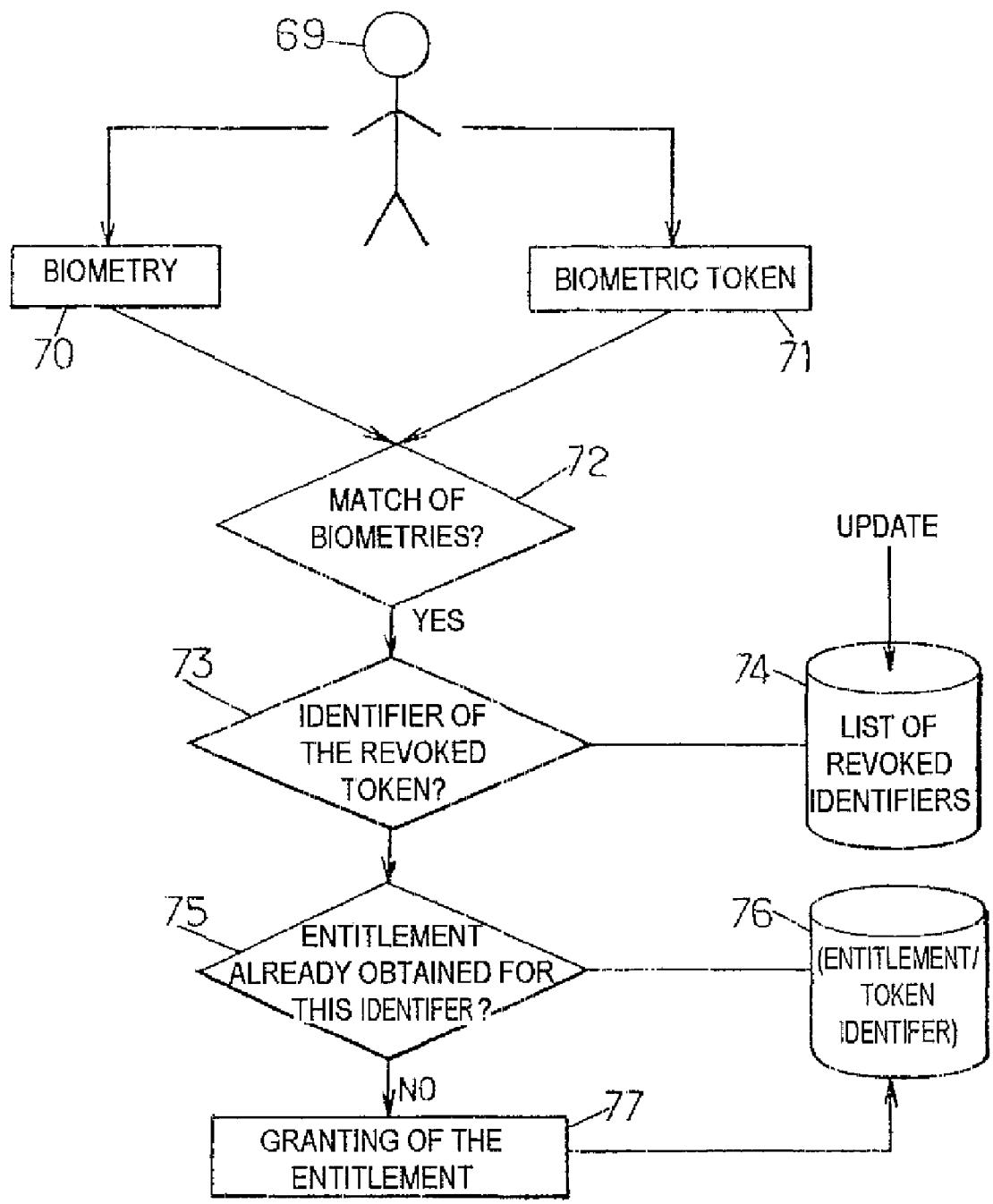
FIG. 9 is a diagram showing a mode of granting an entitlement to a person independently of their identity, according to a particular embodiment of the invention.

In the embodiment illustrated in FIG. 9, an entitlement claimed is granted to a person 69 on the basis of the identifier of the biometric token 71 associated therewith, as in the case described previously with reference to FIG. 6. As in the case illustrated in FIG. 8, a check is made in step 73 to verify that the identifier of the biometric token 71 has not previously been revoked, by querying a list of revoked identifiers 74 compiled on the basis of the previously described list of revoked identifiers 55.

The embodiments of the invention that were described above do not exclude the possibility that a person might usurp the identity of another person and thus obtain a biometric token relating to this usurped identity, to the detriment of this other person. If the person 47 of FIG. 7 has obtained a first biometric token 56, then claims to have lost it, said person may then be the subject of a new enrollment phase in the course of which they state the identity of another person 47'. If the verification of the identity of step 52 is not sufficiently reliable, it is then possible for the person 47 to obtain a new biometric token generated on the basis of their own biometry 48 and of the identity of the person 47'.

Figure 10:
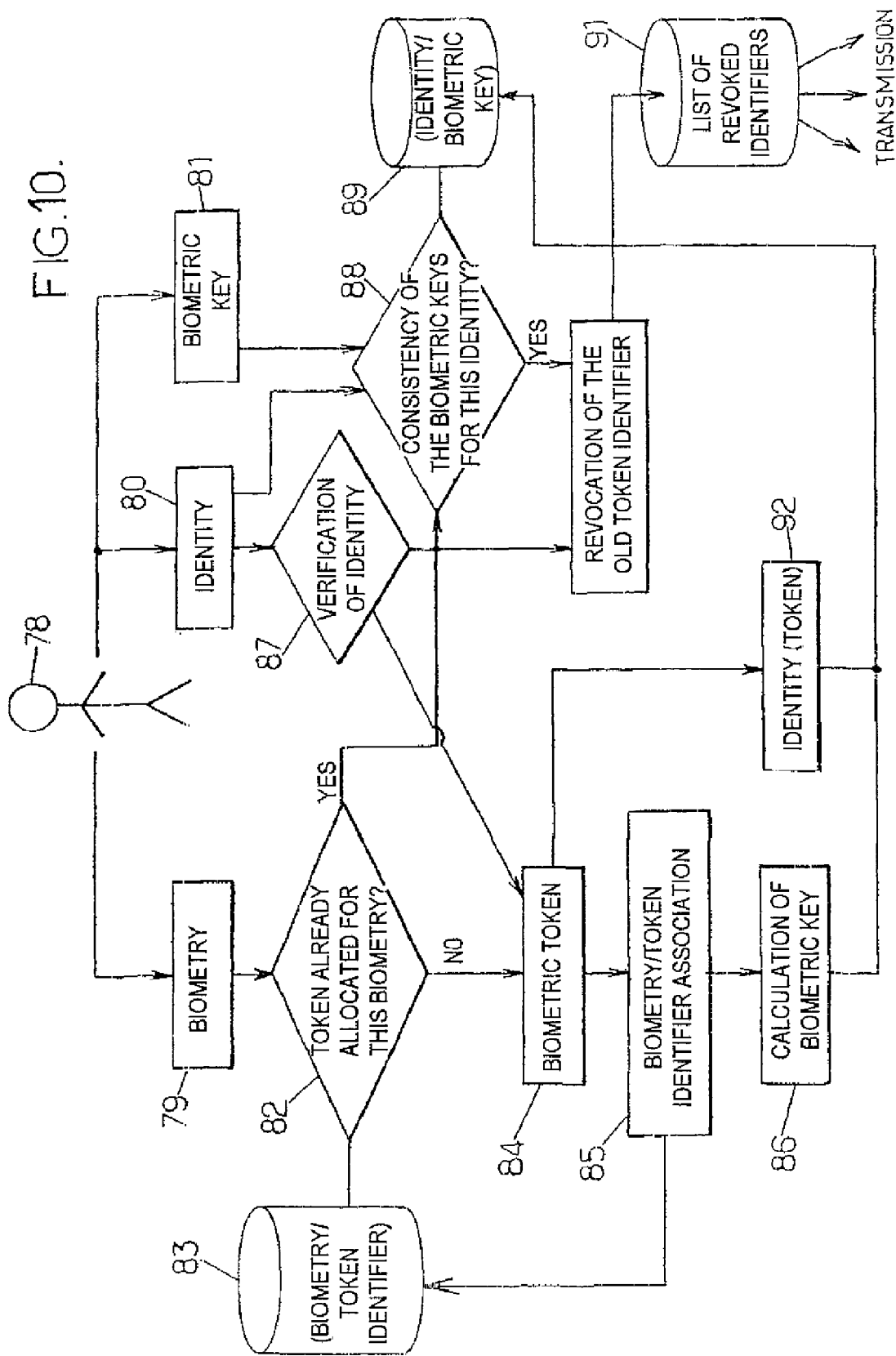
FIGS. 10 and 11 are diagrams showing modes of enrolling a person according to other embodiments of the invention.
Figure 11:
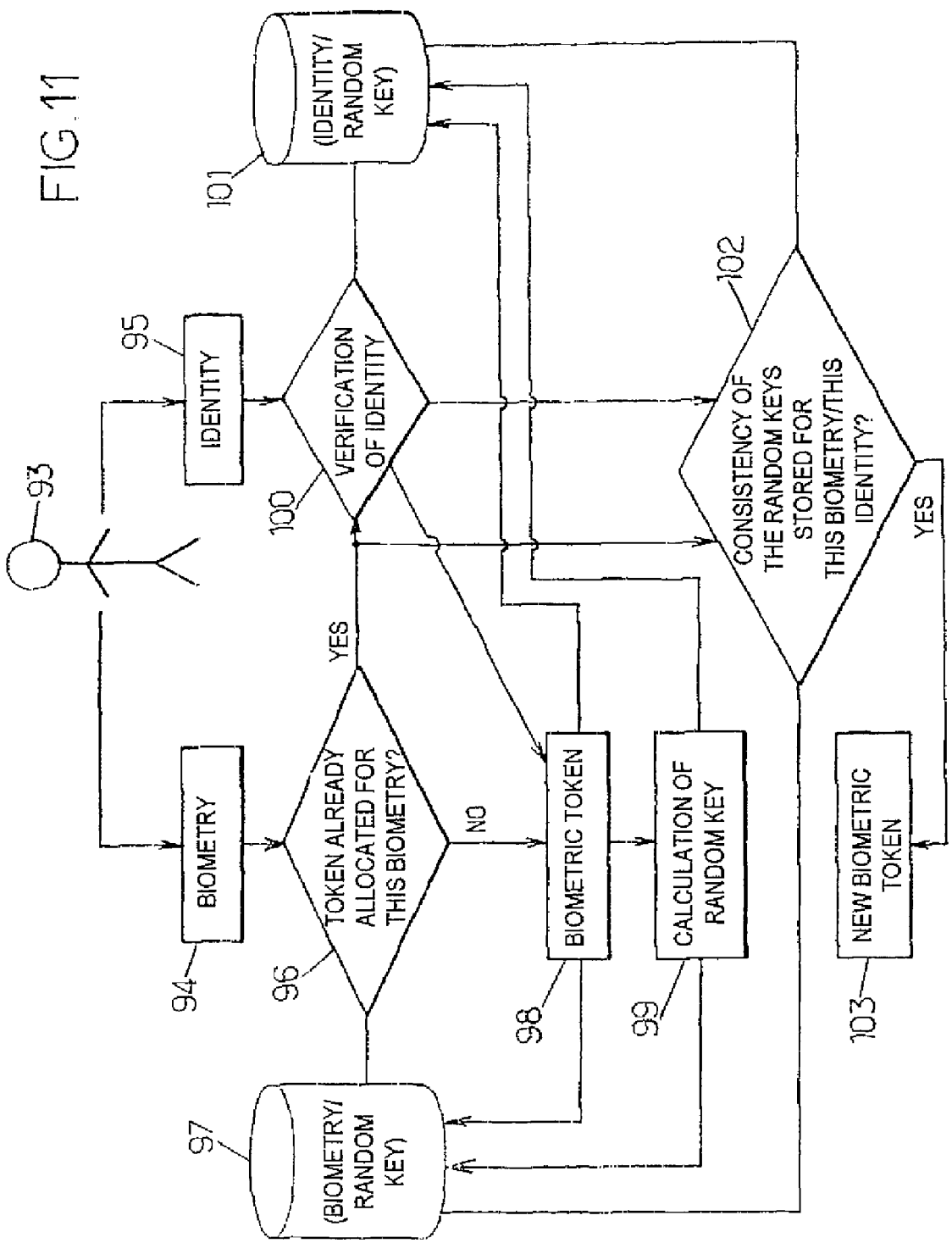

To avoid this situation, it is possible to proceed according to one of the embodiments illustrated in FIGS. 10 and 11. FIG. 10 shows a person 78 having a biometry 79 and an identity 80 that they state for verification in step 87. If it is noted, while searching for the biometry 79 in a database 83 containing the biometries of all the persons having already obtained a token, the biometries being respectively associated with identifiers of corresponding tokens, that the person 78 has never requested the generation of a biometric token, then a biometric token 84 is generated on the basis of the biometry 79 of the person 78 and of the identity 80 that they have declared and which has been verified in step 87. The biometry 79 of the person 78 is then associated with the identifier of the biometric token 84 (step 85) so as to be the subject of a new entry in the database 83.

Furthermore, a biometric key relating to the person 78 is calculated (step 86). This biometric key is a code generated in a robust and reproducible manner, apt for characterizing the person 78 sufficiently for the latter to have a different key value from any other person with a chosen predetermined level of probability, but not sufficiently characterizing to make it possible to retrieve the biometric data relating to the person 78.

By way of example, the biometric key can take a few tens or a few hundreds of different values, when the number of persons apt to claim the granting of entitlements is a population of a few million or a few tens of millions of persons. It may for example take as a value a letter of the alphabet between A and Z (26 different values) or else a number with two digits between 00 and 99 (100 different values). Advantageously, the number of values of the biometric key is adapted to the calculational power necessary to calculate all the combinations by brute force.

The biometric key is calculated on the basis of biometric elements of the relevant person. For example, if the biometric data 79 used to identify the person 78 are fingerprints, the biometric key calculated in step 86 for this person 78 can be obtained on the basis of a coding of the general shape of each print of the fingers of this person 78, given of course that this coding makes it possible to obtain an almost uniform distribution of the codes for the various possible shapes of the fingerprints. As a variant, the biometric data 79 of interest of the person 78, relate to the iris of the eye of the person 78. In this case, the biometric key could be calculated advantageously according to a statistical operation based on the coding of the iris.

Once the biometric key has been calculated for the person 78, the identity of the person 78 is retrieved from the token 84 generated for this person (step 92). Next, the biometric key obtained in step 86 is stored in a database 89, while linking it to the identity of the person 78. This amounts to saying that the database 89 stores the whole set of identities of the persons apt to request the granting of the entitlements, each identity being associated with a biometric key of the corresponding person. In this kind of case, information regarding identities is then stored in conjunction with biometry information. However, given the above-described weakly discriminating mode of calculation of the biometric key, it is not to be feared that the relation stored in the base 89 may make it possible to retrieve the identity of a person on the basis of their biometry, or vice versa.

If subsequently, the person 78 usurps the identity of another person and wishes to have a biometric token generated on the basis of this usurped identity, one proceeds as follows: after having detected that the person 78 had already had a biometric token allocated (step 82), the biometric key 81 associated with the person 78 is calculated. Next, on the basis of the identity 80 declared by the person 78, a check is performed to verify this identity, if possible in a more reliable manner than in the current case (step 87). Then, in step 88, the biometric key 81 is compared with the biometric key associated with the identity 80 stated by the person 78 in the database 89.

If the biometric keys compared are identical, it is then possible to conclude therefrom with a reasonable degree of certainty that the identity 80 is indeed that of the person 78. On the other hand, if the biometric keys compared differ from one another, the identity 80 stated by the person 78 is certainly usurped. In the latter case, it is then possible to choose not to generate new biometric tokens to the person 78 on the basis of this usurped identity.

As in the embodiment described above with reference to FIG. 7, it is possible to revoke the identifier of the old biometric token associated with the person 78 (step 90), when it has been concluded that the identity 80 stated by the person 78 was right on completion of steps 87 and 88. For this purpose, the old token identifier is added to a list of revoked identifiers 91, said list possibly being transmitted to an entity (physical or functional) charged with the actual granting of the entitlements.

In a variant embodiment, illustrated in FIG. 11, a person 93 has a biometric token 98 generated, whilst no biometric token had been associated with this same person previously. Next, a random key is calculated for this person 93 (step 99), which is stored on the one hand, in a biometric database 97, in conjunction with the biometry 94 of the person 93, and on the other hand, in a database of the identities 101, in conjunction with the identity of the person 93 obtained from the biometric token 98 generated for this person.

If the person 93 undergoes a new enrollment phase, step 96 detects that a biometric token has already been associated with this person in the past, by consulting the database 97, on the basis of the biometry 94. Next, a particularly careful check is performed to verify the identity 95 stated by the person 93 (step 100). Also, a comparison is performed between the random keys stored in the database 97 for the biometry 94, and in the database 101 for the identity stated 95 (step 102).

If the random keys stored in the databases 97 and 101 respectively, are not mutually consistent, it is possible to conclude therefrom with a reasonable degree of certainty that the identity 95 stated by the person 93 during this second enrollment has been usurped and therefore corresponds to the identity of another person having already themselves undergone an enrollment phase.

Conversely, if step 102 indicates that the random keys stored in the databases 97 and 101 are identical, it is then probable that the identity 95 stated by the person 93 during this second enrollment is indeed the identity of this person, and not a usurped identity. In this case, it is possible to choose to generate a new biometric token 103 for the attention of the person 93, replacing the token which had previously been allocated to them.

Although not represented in this figure, it is of course possible as in the cases described above, to revoke the identifier of the old biometric token which had been associated with the person 93, in such a way that this person only has one token in force at a time.

In the embodiment of the invention illustrated in FIG. 11, the calculation of the key in step 99 is totally random, thereby limiting the risks of fraud consisting in searching, on the basis of biometric data of a person, for a corresponding key.

It is also noted in this latter embodiment that an identical field (the random key) is stored both in a biometric database 97 and in a database of identities 101. However, the random key being calculated in such a way as to be weakly discriminating (it may for example take between a few tens and a few hundred different values, as in the case described above), it is impossible for a person having access to the databases 97 and 101 to retrieve with certainty a correspondence between the biometry and the identity of a person solely on the basis of the random key.

The invention claimed is:

1. A method of identification control of persons, comprising a phase of generating a unique means of identification associated with at least one person comprising the following steps:
/a/ detecting biometric data relating to said person;
/b/ searching for a match between the biometric data relating to said person and biometric data previously stored in a biometric database, the biometric database not containing identities of persons in association with the biometric data stored, said previously stored biometric data relating to persons for which means of identification have been previously generated; and,
when no match has been found:
/c/ generating a means of identification associated with said person from biometric data relating to said person and at least one identity of said person,
the method furthermore comprising a second phase of granting at least one entitlement to said person, in which:
/d/ said person identifies themselves with the aid of the means of identification which has been previously associated therewith; and
/e/ said entitlement is granted to said person when said entitlement has not already been granted to said person a number of times equal to a predetermined number, by consulting, in a database of entitlements, the entitlements already granted to persons, on the basis of an identifier, wherein the method is performed using a processor.

2. The method as claimed in claim 1, comprising furthermore the step:
/f/ adding the biometric data relating to said person to the biometric database.

3. The method as claimed in claim 2, in which, during step /f/, the biometric data are added to the biometric database in association with a unique identifier of said means of identification associated with said person.

4. The method as claimed in claim 1, furthermore comprising a step of verification of the identity of said person.

5. The method as claimed in claim 4, in which the verification of the identity is reinforced for a person for which a match has been found in step /b/.

6. The method as claimed in claim 1, in which the generation, in step /c/, of a means of identification associated with said person is performed firstly from biometric data relating to said person, then supplemented with the addition of at least one identity of said person.

7. The method as claimed in claim 1, in which the phase of generating a unique means of identification associated with said person furthermore comprises the following steps:
calculating a key associated with said person, the key being able to take a much smaller number of values than the number of persons apt to require the generation of a unique means of identification, and high enough for any two persons to be associated with different keys, with a predetermined level of probability; and
storing said key in a database of the identities in association with an identity of said person.

8. The method as claimed in claim 7, in which the number of values of the key is chosen in such a way as to take account of the calculational power necessary to calculate all the combinations by brute force.

9. The method as claimed in claim 7, in which the number of values of the key lies substantially between a few tens and a few hundreds when the number of persons apt to require the generation of a unique means of identification is a few million or tens of millions.

10. The method as claimed in claim 7, in which the calculation of the key is random.

11. The method as claimed in claim 10, in which moreover the key is stored in the biometric database in association with the biometric data relating to said person.

12. The method as claimed in claim 1, in which step /d/ comprises a comparison between biometric data relating to said person and the biometric data from which the means of identification associated with said person has been generated.

13. The method as claimed in claim 1, in which said identifier is an identity of said person, obtained from the means of identification associated with said person.

14. The method as claimed in claim 1, in which said identifier is a unique identifier of the means of identification associated with said person, this identifier being incorporated into said means of identification associated with said person.

15. A method of identification control of persons, comprising a phase of generating a unique means of identification associated with at least one person comprising the following steps:
/a/ detecting biometric data relating to said person;
/b/ searching for a match between the biometric data relating to said person and biometric data previously stored in a biometric database, the biometric database not containing identities of persons in association with the biometric data stored, said previously stored biometric data relating to persons for which means of identification have been previously generated; and,
when no match has been found:
/c/ generating a means of identification associated with said person from biometric data relating to said person and at least one identity of said person,
in which the phase of generating a unique means of identification associated with said person furthermore comprises the following steps:
calculating a key associated with said person, the key being able to take a much smaller number of values than the number of persons apt to require the generation of a unique means of identification, and high enough for any two persons to be associated with different keys, with a predetermined level of probability; and
storing said key in a database of the identities in association with an identity of said person,
and in which the calculation of the key is performed from biometric data relating to said person, wherein the method is performed using a processor.

16. The method as claimed in claim 15, in which the calculation of the key is performed from the general form of the prints of certain fingers at least of said person.

17. The method as claimed in claim 15, in which the calculation of the key is performed from information relating to the iris of the eye of said person.

18. The method as claimed in claim 15, comprising the following steps, when a match has been found in step /b/:
- obtaining an identity of said person;
- calculating the key associated with said person;
- comparing the calculated key with the key stored in the database of identities in association with the identity obtained for said person; and
- selectively implementing step /c/ as a function of the result of the comparison between said calculated and stored keys.

19. A method of identification control of persons, comprising a phase of generating a unique means of identification associated with at least one person comprising the following steps:
- /a/ detecting biometric data relating to said person;
- /b/ searching for a match between the biometric data relating to said person and biometric data previously stored in a biometric database, the biometric database not containing identities of persons in association with the biometric data stored, said previously stored biometric data relating to persons for which means of identification have been previously generated; and, when no match has been found:
- /c/ generating a means of identification associated with said person from biometric data relating to said person and at least one identity of said person, in which the phase of generating a unique means of identification associated with said person furthermore comprises the following steps:
- calculating a key associated with said person, the key being able to take a much smaller number of values than the number of persons apt to require the generation of a unique means of identification, and high enough for any two persons to be associated with different keys, with a predetermined level of probability; and
- storing said key in a database of the identities in association with an identity of said person, in which the calculation of the key is random,
in which moreover the key is stored in the biometric database in association with the biometric data relating to said person,
the method comprising the following steps, when a match has been found in step /b/:
- obtaining an identity of said person;
- obtaining the key stored in the biometric database in association with the biometric data relating to said person;
- comparing the key obtained with the key stored in the database of identities in association with the identity obtained for said person; and
- selectively implementing step /c/ as a function of the result of the comparison between said keys, wherein the method is performed using a processor.

20. A method of identification control of persons, comprising a phase of generating a unique means of identification associated with at least one person comprising the following steps:
- /a/ detecting biometric data relating to said person;
- /b/ searching for a match between the biometric data relating to said person and biometric data previously stored in a biometric database, the biometric database not containing identities of persons in association with the biometric data stored, said previously stored biometric data relating to persons for which means of identification have been previously generated; and, when no match has been found:
- /c/ generating a means of identification associated with said person from biometric data relating to said person and at least one identity of said person, the method furthermore comprising a second phase of granting at least one entitlement to said person, in which:
- /d/ said person identifies themselves with the aid of the means of identification which has been previously associated therewith; and
- /e/ said entitlement is granted to said person when said entitlement has not already been granted to said person a number of times equal to a predetermined number, in which when a match has been found in step /b/, the unique identifier of the means of identification associated with said person which was stored in the biometric database in association with the biometric data relating to said person is added to a first list of the identifiers of the revoked means of identification, and, in which step /e/ is selectively implemented depending on whether the identifier of the means of identification with which said person is identified is or is not stored in a second list of the identifiers of the revoked means of identification, wherein the method is performed using a processor.

21. The method as claimed in claim 20, in which the phases of generating a unique means of identification associated with said person and of granting at least one entitlement to said person are implemented by a first and a second entity respectively, and in which the first list of the identifiers of the revoked means of identification is stored on a database of the identifiers of the revoked means of identification that can be consulted by the second entity, the second list of the identifiers of the revoked means of identification then being identical to the first list of the identifiers of the revoked means of identification.

22. The method as claimed in claim 20, in which the phases of generating a unique means of identification associated with said person and of granting at least one entitlement to said person are implemented by a first and a second entity respectively, and in which the identifiers added to the first list of the identifiers of the revoked means of identification are transmitted from the first entity to the second entity to update the second list of the identifiers of the revoked means of identification.

23. The method as claimed in claim 22, in which the transmission of the identifiers from the first entity to the second entity is performed according to at least one of the following mechanisms: by periodic transfer of said identifiers added to the first list of the identifiers of the revoked means of identification since the last transfer, or by periodic transfer of the whole set of identifiers stored in the first list of the identifiers of the revoked means of identification, or by instantaneous transfer of each identifier upon its addition to the first list of the identifiers of the revoked means of identification.

24. A system of identification control of persons, for generating a unique means of identification associated with at least one person, the system comprising:
- /a/ means for detecting biometric data relating to said person;
- /b/ means for searching for a match between the biometric data relating to said person and biometric data previously stored in a biometric database, the biometric database not containing identities of persons in association with the biometric data stored, said previously stored biometric data relating to persons for which means of identification have been previously generated; and, /c/ means for, when no match has been found, generating a means of identification associated with said person from biometric data relating to said person and at least one identity of said person, the system furthermore comprising, for granting at least one entitlement to said person:

/d/ means for said person to identify themselves with the aid of the means of identification which has been previously associated therewith; and /e/ means for granting said entitlement to said person when said entitlement has not already been granted to said person a number of times equal to a predetermined number, the means /e/ comprising means for consulting, in a database of entitlements, the entitlements already granted to persons, on the basis of an identifier.

25. The system as claimed in claim 24, furthermore comprising:

/f/ means for adding the biometric data relating to said person to the biometric database.

26. The system as claimed in claim 25, in which the means /f/ are such that the biometric data are added to the biometric database in association with a unique identifier of said means of identification associated with said person.

27. The system as claimed in claim 24, furthermore comprising means of verification of the identity of said person.

28. The system as claimed in claim 27, in which the means of verification of the identity are such that the verification of the identity is reinforced for a person for which a match has been found by the means /b/.

29. The system as claimed in claim 24, in which the means for generating a means of identification associated with said person are arranged such that the generation of a means of identification is performed firstly from biometric data relating to said person, then supplemented with the addition of at least one identity of said person.

30. The system as claimed in claim 24, furthermore comprising:

means for calculating a key associated with said person, the key being able to take a much smaller number of values than the number of persons apt to require the generation of a unique means of identification, and high enough for any two persons to be associated with different keys, with a predetermined level of probability; and means for storing said key in a database of the identities in association with an identity of said person.

31. The system as claimed in claim 30, in which the number of values of the key is chosen in such a way as to take account of the calculational power necessary to calculate all the combinations by brute force.

32. The system as claimed in claim 30, in which the number of values of the key lies substantially between a few tens and a few hundreds when the number of persons apt to require the generation of a unique means of identification is a few million or tens of millions.

33. The system as claimed in claim 30, in which the means for calculating are such that the calculation of the key is random.

34. The system as claimed in claim 33, further comprising means for storing the key in the biometric database in association with the biometric data relating to said person.

35. The system as claimed in claim 24, in which the means /e/ comprise means for comparing between biometric data relating to said person and the biometric data from which the means of identification associated with said person has been generated.

36. The system as claimed in claim 24, in which said identifier is an identity of said person, obtained from the means of identification associated with said person.

37. The system as claimed in claim 24, in which said identifier is a unique identifier of the means of identification associated with said person, this identifier being incorporated into said means of identification associated with said person.

38. A system of identification control of persons, for generating a unique means of identification associated with at least one person, the system comprising:

/a/ means for detecting biometric data relating to said person;

/b/ means for searching for a match between the biometric data relating to said person and biometric data previously stored in a biometric database, the biometric database not containing identities of persons in association with the biometric data stored, said previously stored biometric data relating to persons for which means of identification have been previously generated; and, /c/ means for, when no match has been found, generating a means of identification associated with said person from biometric data relating to said person and at least one identity of said person, the system furthermore comprising:

means for calculating a key associated with said person, the key being able to take a much smaller number of values than the number of persons apt to require the generation of a unique means of identification, and high enough for any two persons to be associated with different keys, with a predetermined level of probability; and means for storing said key in a database of the identities in association with an identity of said person, in which the means for calculating are such that the calculation of the key is performed from biometric data relating to said person.

39. The system as claimed in claim 38, in which the means for calculating are such that the calculation of the key is performed from the general form of the prints of certain fingers at least of said person.

40. The system as claimed in claim 38, in which the means for calculating are such that the calculation of the key is performed from information relating to the iris of the eye of said person.

41. The system as claimed in claim 38, comprising:

means for obtaining an identity of said person;

means for calculating the key associated with said person;

means for comparing the calculated key with the key stored in the database of identities in association with the identity obtained for said person; and means for selectively implementing the means /c/ as a function of the result of the comparison between said calculated and stored keys, when a match has been found by the means /b/.

42. A system of identification control of persons, for generating a unique means of identification associated with at least one person, the system comprising:

/a/ means for detecting biometric data relating to said person;

/b/ means for searching for a match between the biometric data relating to said person and biometric data previously stored in a biometric database, the biometric database not containing identities of persons in association with the biometric data stored, said previously stored biometric data relating to persons for which means of identification have been previously generated; and, /c/ means for, when no match has been found, generating a means of identification associated with said person from biometric data relating to said person and at least one identity of said person, the system furthermore comprising:

means for calculating a key associated with said person, the key being able to take a much smaller number of values than the number of persons apt to require the generation of a unique means of identification, and high enough for any two persons to be associated with different keys, with a predetermined level of probability; and means for storing said key in a database of the identities in association with an identity of said person, in which the means for calculating are such that the calculation of the key is random, the system further comprising:

means for storing the key in the biometric database in association with the biometric data relating to said person, and means for obtaining an identity of said person;

means for obtaining the key stored in the biometric database in association with the biometric data relating to said person;

means for comparing the key obtained with the key stored in the database of identifies in association with the identity obtained for said person; and means for selectively implementing the means /c/ as a function of the result of the comparison between said keys, when a match has been found by the means /b/.

43. A system of identification control of persons, for generating a unique means of identification associated with at least one person, the system comprising:

/a/ means for detecting biometric data relating to said person;

/b/ means for searching for a match between the biometric data relating to said person and biometric data previously stored in a biometric database, the biometric database not containing identities of persons in association with the biometric data stored, said previously stored biometric data relating to persons for which means of identification have been previously generated; and, /c/ means for, when no match has been found, generating a means of identification associated with said person from biometric data relating to said person and at least one identity of said person, the system furthermore comprising, for granting at least one entitlement to said person:

/d/ means for said person to identify themselves with the aid of the means of identification which has been previously associated therewith; and /e/ means for granting said entitlement to said person when said entitlement has not already been granted to said person a number of times equal to a predetermined number, the system further comprising means for adding the unique identifier of the means of identification associated with said person which was stored in the biometric database in association with the biometric data relating to said person to a first list of the identifiers of the revoked means of identification, and means for selectively implementing the means /e/ depending on whether the identifier of the means of identification with which said person is identified is or is not stored in a second list of the identifiers of the revoked means of identification, when a match has been found by the means /b/.

44. A system of identification control of persons, for generating a unique means of identification associated with at least one person, the system comprising:

/a/ means for detecting biometric data relating to said person;

/b/ means for searching for a match between the biometric data relating to said person and biometric data previously stored in a biometric database, the biometric database not containing identities of persons in association with the biometric data stored, said previously stored biometric data relating to persons for which means of identification have been previously generated; and, /c/ means for, when no match has been found, generating a means of identification associated with said person from biometric data relating to said person and at least one identity of said person, the system further comprising a first entity designed to implement means for participating in generating a unique means of identification associated with at least one person, and a second entity designed to implement means for participating in granting at least one entitlement to at least one person.

* * * * *